July 3, 1962  H. ROSSKOPF  3,042,462
ARRANGEMENT FOR LUBRICATING AND COOLING ROTATING PARTS
Filed May 16, 1960
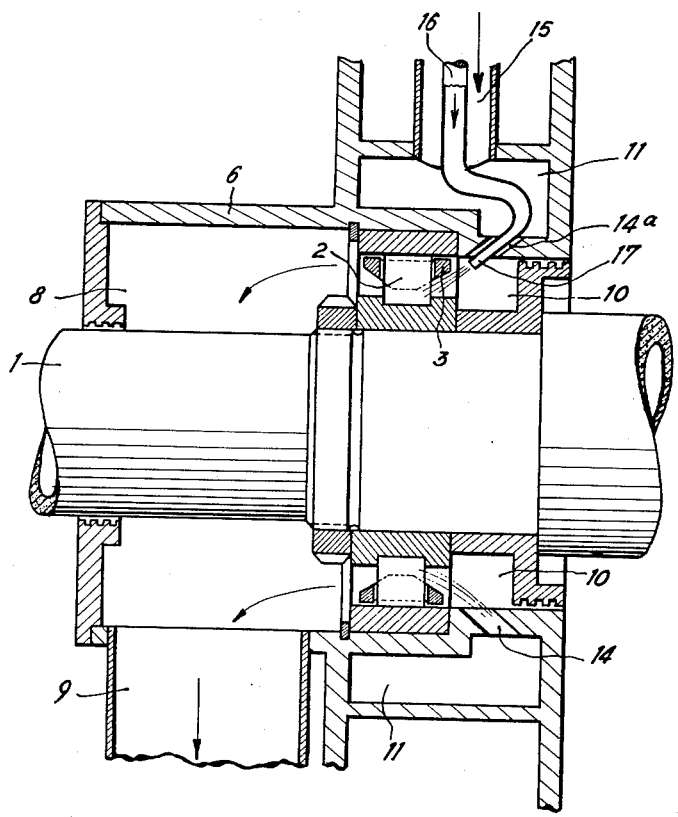
INVENTOR
Hans Rosskopf
By
Watson, Cole, Grindle & Watson
ATTORNEYS

United States Patent Office 3,042,462
Patented July 3, 1962

3,042,462
ARRANGEMENT FOR LUBRICATING AND COOLING ROTATING PARTS
Hans Rosskopf, Dammarie-les-Lys, France, assignor to Societe Nationale d'Etude et de Construction de Moteurs d'Aviation, Paris, France, a company of France
Filed May 16, 1960, Ser. No. 29,436
Claims priority, application France May 27, 1959
3 Claims. (Cl. 308—187)

The present invention relates to an arrangement for lubricating and cooling mechanical parts which may operate at high temperatures and high speeds, such as, for example, roller or ball bearings, gears, etc.

Usually, lubrication can be carried out by immersing the moving parts, for example a bearing in thick grease, but this means is ineffective in the case of a high surrounding temperature and a high speed of rotation. The grease loses its thickness, decomposes and flows out of the bearing. Moreover, the kneading of the grease inside the bearing by the moving elements (balls or rollers) increases the operating temperature. The cooling provided by the outside air is generally inadequate.

It is also possible to ensure lubrication by means of oil under pressure flowing in a closed circuit. The oil, injected into the bearing in large quantities, permits lubrication and cooling of the latter. Recycling of the oil and cooling thereof in an exchanger are imperative if it is desired to limit the quantity of oil consumed, but if the properties of the oil are impaired at the operating temperature recycling is not permissible and this method becomes impracticable.

Another method consists in effecting the lubrication by an air-oil mist under pressure. The oil is atomized in a special device by means of compressed air and the air-oil mist passes through the bearing.

The quantity of oil may be reduced to the minimum strictly necessary for correct lubrication of the bearing, while the air serves to convey the oil and to cool the bearing. It is possible not to recover the oil and the heating of the bearing due to the mixing of the oil is reduced to the minimum because of the small quantity of oil used. However, the device providing the atomizing action is located a long way from the bearing and the path covered from the atomizing system to the bearing frequently passes through hot parts. Prolonged contact of the oil and the air at high temperature over a large area causes oxidation of the oil and the loss of its lubricating qualities.

Finally, another form of lubrication consists in creating a certain reserve of oil immediately in front on the bearing. The surplus of this reserve passes through the bearing and is continuously replaced by fresh oil, but the prolonged sojourn of the oil close to the bearing causes a fatal transformation of said oil by the heat. The cooling of the bearing is frequently facilitated by a flow of air passing to the outside of the seat and to the inside of the shaft, but this flow of air generally no longer exists when the machine stops. The radiation of heat from the hot parts causes burning of the oil in reserve and a deposit of varnish and gum is formed which is liable to block the lubricating circuit.

The lubricating and cooling arrangement according to the invention enables these drawbacks to be remedied.

According to the invention, the lubricating oil and the cooling air are conducted separately into the immediate proximity of the parts to be cooled and lubricated, the oil being projected by a nozzle in the form of a compact jet directed on to the part to be lubricated and the air being piped in such manner as to envelop the jet of oil and pass directly through the part to be cooled.

Thus, since the air and the oil are conveyed separately, deterioration of the oil is avoided. Likewise, the oil issuing in the form of a compact jet has a small area of contact with the air and is thus little exposed to the risk of oxidation by said air, contrary to what occurs when the oil is atomized in the presence of air at a distance from the parts to be lubricated. Finally, the air, in passing directly through the part, removes the heat from the very place where it has originated.

The description which follows with reference to the accompanying drawing, which is given by way of non-limitative example, will make it quite clear how the invention may be carried into practice.

The drawing shows a part of a shaft 1 supported by a roller bearing 2 and seated in a housing 6 forming an annular chamber 11 around the bearing. This chamber communicated with another chamber 10 through a series of orifices 14 directed towards the bearing. A chamber 8 formed by the housing on the other side of the bearing is provided with an evacuation pipe 9. A small compressed air pipe 15 opens into the chamber 11.

A conduit 16 supplied with oil is disposed, for example, inside the compressed air pipe 15. The conduit passes through the chamber 11 and terminates in an outlet nozzle 17 which extends through one of the orifices 14 formed in the wall 6, that is 14a, being directed towards the bearing 2 as close as possible thereto.

The oil is conducted under pressure through the conduit 16 and issues through the nozzle 17 in the form of a continuous or discontinuous jet, but in small quantity.

The compressed air enters the chamber 11 through the pipe 15 and passes through the orifices 14. The elements of the arrangement are designed so that the pressure in the chambers 11, 10 and 8 decreases so as to ensure the appropriate circulation of air. The compressed air envelops the jet of oil, guides it towards the bearing and thus avoids atomization of the oil by the air eddies created by the rotation of the shaft and of the elements of the bearing. The oil thus presents a minimum area capable of being oxidized during its short journey from the nozzle 17 to the bearing 2. Atomizing thereof occurs only at the moment of contact with the bearing. The oil therefore performs its function of lubricant. Moreover, the entry of the oil into the bearing is sufficiently rapid for decomposition of said oil not to have the time to occur. The particles of oil are swept out of the bearing by the flow of compressed air before they can undergo any substantial deterioration due to the heat. After the air-oil mixture under pressure has passed through the bearing, it enters the annular chamber 8. It is then evacuated through the pipe 9, which may perform the same function for other bearings.

The compressed air serves not only for the rapid conveyance and the evacuation of the oil, but also, to a very considerable extent, for cooling the rubbing parts of the bearing, especially the cage 3 and the rollers 2, which have no contact with the outer parts of the bearing. The air thus removes the heat at the very place where it has originated and thus ensures effective cooling.

Owing to the orientation of the nozzle 17, each drop of oil arrives at the very place where lubrication is necessary. The quantity of oil used is therefore small and, according to the invention, it is possible to obtain consumable lubrication, the oil not being recovered at the outlet of the chamber 8.

What is claimed is:
1. A lubricating and cooling system comprising rotating parts, and means rotatably supporting said parts, said means defining passageways terminating in the close vicinity of said rotating parts and directed toward said parts, said passageways being fed with cooling air under pressure, duct means in said passageways, said duct means terminating in the close vicinity of said rotating parts while being directed toward said parts and being fed with lubricating oil under pressure, whereby a compact lubricating oil jet surrounded by cooling air under pressure is directed onto said rotating parts.

2. A system according to claim 1 wherein said passageways and said duct means disposed therein are substantially parallel.

3. A system according to claim 1 wherein said duct means terminates in the form of a nozzle.

References Cited in the file of this patent

UNITED STATES PATENTS

| | | |
|---|---|---|
| 1,769,736 | Fieux | July 1, 1930 |
| 2,935,353 | Schindel | May 3, 1960 |
| 2,986,433 | Herrmann | May 30, 1961 |